(12) United States Patent
Furuta et al.

(10) Patent No.: US 9,005,480 B2
(45) Date of Patent: Apr. 14, 2015

(54) METHOD FOR SOLVENTLESS QUANTUM DOT EXCHANGE

(71) Applicant: Nanosys, Inc., Milipitas, CA (US)

(72) Inventors: Paul T. Furuta, Sunnyvale, CA (US); Robert Dubrow, San Carlos, CA (US)

(73) Assignee: Nanosys, Inc., Milpitas, CA (US)

(*) Notice: Subject to any disclaimer, the term of this patent is extended or adjusted under 35 U.S.C. 154(b) by 0 days.

(21) Appl. No.: 14/208,095

(22) Filed: Mar. 13, 2014

(65) Prior Publication Data

US 2014/0264189 A1 Sep. 18, 2014

Related U.S. Application Data

(60) Provisional application No. 61/781,285, filed on Mar. 14, 2013.

(51) Int. Cl.
*C09K 11/54* (2006.01)
*C09K 11/02* (2006.01)

(52) U.S. Cl.
CPC .............. *C09K 11/02* (2013.01); *Y10S 977/773* (2013.01); *Y10S 977/774* (2013.01)

(58) Field of Classification Search
CPC .... B82Y 40/00; C09K 11/025; C09K 11/883; C09K 11/70; C09K 11/881; C09K 11/661; C09K 11/703
USPC ........... 252/519.31, 521.3, 301.4 R; 977/773, 977/774
See application file for complete search history.

(56) References Cited

U.S. PATENT DOCUMENTS

| | | | |
|---|---|---|---|
| 2,381,366 A | 8/1945 | Patnode | |
| 4,093,777 A | 6/1978 | Heine et al. | |
| 4,181,753 A | 1/1980 | Fischer | |
| 4,258,080 A | 3/1981 | Sonoda et al. | |
| 4,263,339 A | 4/1981 | Fischer | |
| 5,023,139 A | 6/1991 | Birnboim et al. | |
| 5,124,278 A | 6/1992 | Bohling et al. | |
| 5,126,204 A | 6/1992 | Tono et al. | |
| 5,196,229 A | 3/1993 | Chau | |
| 5,230,957 A | 7/1993 | Lin | |
| 5,260,957 A | 11/1993 | Hakimi et al. | |
| 5,262,357 A | 11/1993 | Alivisatos et al. | |
| 5,330,791 A | 7/1994 | Aihara et al. | |
| 5,376,307 A | 12/1994 | Hagiwara et al. | |
| 5,396,148 A | 3/1995 | Endo et al. | |
| 5,505,928 A | 4/1996 | Alivisatos et al. | |
| 5,518,808 A | 5/1996 | Bruno et al. | |
| 5,532,023 A | 7/1996 | Vogel et al. | |
| 5,537,000 A | 7/1996 | Alivisatos et al. | |
| 5,645,752 A | 7/1997 | Weiss et al. | |
| 5,707,139 A | 1/1998 | Haitz | |
| 5,744,233 A | 4/1998 | Opitz et al. | |
| 5,751,018 A | 5/1998 | Alivisatos et al. | |
| 5,777,433 A | 7/1998 | Lester et al. | |
| 5,853,887 A | 12/1998 | Yoshimoto et al. | |
| 5,882,779 A | 3/1999 | Lawandy | |
| 5,892,084 A | 4/1999 | Janeiro et al. | |
| 5,958,591 A | 9/1999 | Budd | |
| 5,985,173 A | 11/1999 | Gray et al. | |
| 5,990,479 A | 11/1999 | Weiss et al. | |
| 6,084,250 A | 7/2000 | Justel et al. | |
| 6,114,038 A | 9/2000 | Castro | |
| 6,147,363 A | 11/2000 | Udagawa | |
| 6,153,123 A | 11/2000 | Hampden-Smith et al. | |
| 6,179,912 B1 | 1/2001 | Barbera-Guillem et al. | |
| 6,180,029 B1 | 1/2001 | Hampden-Smith et al. | |
| 6,207,229 B1 | 3/2001 | Bawendi et al. | |
| 6,207,392 B1 | 3/2001 | Weiss et al. | |
| 6,225,198 B1 | 5/2001 | Alivisatos et al. | |
| 6,251,303 B1 | 6/2001 | Bawendi et al. | |
| 6,278,135 B1 | 8/2001 | Srivastava et al. | |
| 6,294,800 B1 | 9/2001 | Duggal et al. | |
| 6,306,610 B1 | 10/2001 | Bawendi et al. | |
| 6,306,736 B1 | 10/2001 | Alivisatos et al. | |
| 6,319,426 B1 | 11/2001 | Bawendi et al. | |
| 6,322,901 B1 | 11/2001 | Bawendi et al. | |
| 6,326,144 B1 | 12/2001 | Bawendi et al. | |
| 6,344,520 B1 | 2/2002 | Greene | |
| 6,353,073 B1 | 3/2002 | Biggs et al. | |
| 6,423,551 B1 | 7/2002 | Weiss et al. | |
| 6,426,513 B1 | 7/2002 | Bawendi et al. | |
| 6,429,583 B1 | 8/2002 | Levinson et al. | |
| 6,440,213 B1 | 8/2002 | Alivisatos et al. | |
| 6,444,143 B2 | 9/2002 | Bawendi et al. | |

(Continued)

FOREIGN PATENT DOCUMENTS

| | | | |
|---|---|---|---|
| WO | WO 99/27584 A1 | 6/1999 | |
| WO | WO 03/054953 A1 | 7/2003 | |

(Continued)

OTHER PUBLICATIONS

Akcora, P., et al., "Structural and magnetic characterization of norbornene-deuterated norbornene dicarboxylic acid diblock copolymers doped with iron oxide nanoparticles" Polymer (2005) 46(14):5194-5201.

Alivisatos, A., "Semiconductor Clusters, Nanocrystals, and Quantum Dots," Science 271:933-937 (1996).

Battaglia, D. et al., "Formation of high quality InP and InAs nanocrystals in a noncoordinating solvent" Nano Lett (2002) 2(9):1027-1030.

Beachley, O.T. Jr. et al., "Reagents based on cyclopentadienyl derivatives of the group 14 elements for the synthesis of indium(I) derivatives. Crystal and molecular structure of In(C5H4SiMe3)" Organometallics (1990) 9:2488-2492.

(Continued)

*Primary Examiner* — Mark Kopec
*Assistant Examiner* — Haidung Nguyen
(74) *Attorney, Agent, or Firm* — Sterne, Kessler, Goldstein & Fox PLLC

(57) ABSTRACT

The present invention describes a solventless ligand exchange using a siloxane polymer having a binding ligand that displaces the binding ligand on a quantum dot material.

15 Claims, 1 Drawing Sheet

(56) References Cited

U.S. PATENT DOCUMENTS

| | | |
|---|---|---|
| 6,468,808 B1 | 10/2002 | Nie et al. |
| 6,482,672 B1 | 11/2002 | Hoffman et al. |
| 6,501,091 B1 | 12/2002 | Bawendi et al. |
| 6,573,535 B2 | 6/2003 | Hori et al. |
| 6,576,291 B2 | 6/2003 | Bawendi et al. |
| 6,602,671 B1 | 8/2003 | Bawendi et al. |
| 6,607,829 B1 | 8/2003 | Bawendi et al. |
| 6,617,583 B1 | 9/2003 | Bawendi et al. |
| 6,660,281 B1 | 12/2003 | Nakanishi et al. |
| 6,682,596 B2 | 1/2004 | Zehnder et al. |
| 6,696,299 B1 | 2/2004 | Empedocles et al. |
| 6,699,723 B1 | 3/2004 | Weiss et al. |
| 6,711,426 B2 | 3/2004 | Benaron et al. |
| 6,713,586 B2 | 3/2004 | Greene |
| 6,727,065 B2 | 4/2004 | Weiss et al. |
| 6,734,465 B1 | 5/2004 | Taskar et al. |
| 6,774,361 B2 | 8/2004 | Bawendi et al. |
| 6,781,166 B2 | 8/2004 | Lieber et al. |
| 6,783,855 B1 | 8/2004 | Dobson et al. |
| 6,788,453 B2 | 9/2004 | Banin et al. |
| 6,803,719 B1 | 10/2004 | Miller et al. |
| 6,815,064 B2 | 11/2004 | Treadway et al. |
| 6,819,692 B2 | 11/2004 | Bawendi et al. |
| 6,821,337 B2 | 11/2004 | Bawendi et al. |
| 6,855,202 B2 | 2/2005 | Alivisatos et al. |
| 6,855,551 B2 | 2/2005 | Bawendi et al. |
| 6,861,155 B2 | 3/2005 | Bawendi et al. |
| 6,864,626 B1 | 3/2005 | Schlamp et al. |
| 6,870,311 B2 | 3/2005 | Mueller et al. |
| 6,872,249 B2 | 3/2005 | Peng et al. |
| 6,884,478 B2 | 4/2005 | Alivisatos et al. |
| 6,890,777 B2 | 5/2005 | Bawendi et al. |
| 6,914,265 B2 | 7/2005 | Bawendi et al. |
| 6,918,946 B2 | 7/2005 | Korgel et al. |
| 6,921,496 B2 | 7/2005 | Anderson et al. |
| 6,927,069 B2 | 8/2005 | Weiss et al. |
| 6,933,535 B2 | 8/2005 | Steigerwald et al. |
| 6,949,206 B2 | 9/2005 | Whiteford et al. |
| 6,984,369 B1 | 1/2006 | Alivisatos et al. |
| 7,049,148 B2 | 5/2006 | Bawendi et al. |
| 7,060,243 B2 | 6/2006 | Bawendi et al. |
| 7,091,120 B2 | 8/2006 | Buretea et al. |
| 7,091,656 B2 | 8/2006 | Murazaki et al. |
| 7,175,778 B1 | 2/2007 | Bhargava et al. |
| 7,267,865 B2 | 9/2007 | Hetzler et al. |
| 7,267,875 B2 | 9/2007 | Whiteford et al. |
| 7,326,908 B2 | 2/2008 | Sargent et al. |
| 7,332,701 B2 | 2/2008 | Van Arendonk et al. |
| 7,374,807 B2 | 5/2008 | Parce et al. |
| 7,432,642 B2 | 10/2008 | Murazaki |
| 7,572,393 B2 | 8/2009 | Whiteford et al. |
| 7,598,314 B2 | 10/2009 | Lee et al. |
| 7,645,397 B2 | 1/2010 | Parce et al. |
| 7,750,235 B2 | 7/2010 | Scher et al. |
| 7,834,121 B2 | 11/2010 | Mowrer et al. |
| 8,053,972 B2 | 11/2011 | Bawendi et al. |
| 8,071,079 B2 | 12/2011 | DeCaire et al. |
| 2002/0066401 A1 | 6/2002 | Peng et al. |
| 2002/0071952 A1 | 6/2002 | Bawendi et al. |
| 2002/0105004 A1 | 8/2002 | Hori et al. |
| 2002/0130311 A1 | 9/2002 | Lieber et al. |
| 2003/0010987 A1 | 1/2003 | Banin et al. |
| 2003/0066998 A1 | 4/2003 | Lee |
| 2003/0142944 A1 | 7/2003 | Sundar et al. |
| 2003/0145779 A1 | 8/2003 | Alivisatos et al. |
| 2003/0175004 A1 | 9/2003 | Garito et al. |
| 2003/0185771 A1 | 10/2003 | Kamei et al. |
| 2003/0226498 A1 | 12/2003 | Alivisatos et al. |
| 2004/0004982 A1 | 1/2004 | Eisler et al. |
| 2004/0007169 A1 | 1/2004 | Ohtsu et al. |
| 2004/0017834 A1 | 1/2004 | Sundar et al. |
| 2004/0023010 A1 | 2/2004 | Bulovic et al. |
| 2004/0033270 A1 | 2/2004 | Kropf et al. |
| 2004/0178390 A1 | 9/2004 | Whiteford et al. |
| 2004/0245912 A1 | 12/2004 | Thurk et al. |
| 2005/0161666 A1 | 7/2005 | Park et al. |
| 2005/0179364 A1 | 8/2005 | Murazaki |
| 2005/0234416 A1 | 10/2005 | Kropf et al. |
| 2006/0001119 A1 | 1/2006 | Liu et al. |
| 2006/0040103 A1 | 2/2006 | Whiteford et al. |
| 2006/0060862 A1 | 3/2006 | Bawendi et al. |
| 2006/0068154 A1 | 3/2006 | Parce et al. |
| 2006/0110279 A1 | 5/2006 | Han et al. |
| 2006/0157686 A1 | 7/2006 | Jang et al. |
| 2007/0034833 A1 | 2/2007 | Parce et al. |
| 2007/0185261 A1 | 8/2007 | Lee et al. |
| 2007/0213492 A1 | 9/2007 | Mowrer et al. |
| 2008/0090947 A1 | 4/2008 | Shin et al. |
| 2008/0118755 A1 | 5/2008 | Whiteford et al. |
| 2010/0140551 A1 | 6/2010 | Parce et al. |
| 2010/0167011 A1 | 7/2010 | Dubrow |
| 2010/0276638 A1 | 11/2010 | Liu et al. |
| 2010/0278770 A1 | 11/2010 | Arditty et al. |
| 2012/0113672 A1 | 5/2012 | Dubrow |
| 2013/0345458 A1 | 12/2013 | Freeman et al. |
| 2014/0001405 A1 | 1/2014 | Guo et al. |
| 2014/0264189 A1 | 9/2014 | Furuta et al. |
| 2014/0275598 A1 | 9/2014 | Freeman et al. |

FOREIGN PATENT DOCUMENTS

| | | |
|---|---|---|
| WO | WO 03/092081 A1 | 11/2003 |
| WO | WO 2005/022120 A2 | 3/2005 |
| WO | WO 2005/023923 A2 | 3/2005 |
| WO | WO 2008/013780 A2 | 3/2008 |

OTHER PUBLICATIONS

Beachley, O.T. Jr. et al., "Chemistry of In($C_5H_5$)$_3$ and Some Heteroleptic Organoindium(III) Derivatives. Crystal and Molecular Structures of In($C_5H_5$)$_3$, ($C_5H_5$)$_2$In•PPh$_3$, and (Me$_3$CCH$_2$)$_2$In($C_5H_5$)" Organometallics (2002) 21:4632-4640.

Beletskaya, I.P. et al., "New approach to phosphinoalkynes based on Pd- and Ni-catalyzed cross-coupling of erminal alkynes with chlorophosphanes" Org. Lett (2003) 5(23):4309-4311.

Bharali, D.J. et al., "Folate-receptor-medicated delivery of InP quantum dots for bioimaging using confocal and two-photon microscopy" J. Am. Chem. Soc. (2005) 127:11367-11371.

Boeckman, R.K., Jr. et al., "Cyclic vinyl ether carbanions I: synthetic equivalents of β-acylvinyl and substituted acyl anions" Tet Lett (1977) 48:4187-4190.

Boeckman, R.K., Jr. et al., "Cyclic vinyl ether carbanions—II: preparation and applications of the synthesis of carbonyl compounds" Tetrahedron (1981) 37(23):3997-4006.

Bradley, D.C et al., "A penta-indium oxo alkoxide cluster with a central 5-co-ordinate oxygen. Preparation and X-ray crystal structure of (InOPr$^i$)$_5$(μ$_2$-OPr$^i$)$_4$(μ$_3$-OPr$^i$)$_4$(μ$_5$-O)" J. Chem. Soc. Chem. Commun (1987) 18:1258-1259.

Bradley, D.C. et al., "Pentanuclear oxoalkoxide clusters of scandium, yttrium, indium and ytterbium, X-ray crystal structures of [M$_5$(μ$_5$-O)(μ$_3$-OPr$^i$)$_4$(μ$_2$-OPr$^i$)$_4$(OPr$^i$)$_5$] (M = In,Yb)" Polyhedron (1990) 9(5):719-726.

Bullen, C. et al., "The effects of chemisorption on the luminescence of CdSe quantum dots" Langmuir (2006) 22:3007-3013.

Cao, L. et al., "Luminescence enhancement of core-shell ZnS:Mn/ZnS nanoparticles" Appl Phys Lett (2002) 80(23):4300-4302.

Cao, Y.W. et al., "Colloidal synthesis and properties of lnAs/InP and lnAs/CdSe core/shell nanocrystals" Mat. Res. Soc. Symp. Proc. (2000) 571:75-80.

Cao, Y.W. et al., "Growth and Properties of Semiconductor Core/Shell Nanocrystals with InAs Cores" J. Am. Chem. Soc. (2000) 122:9692-9702.

Chen, H.-S. et al., "Colloidal ZnSe, ZnSe/ZnS, and ZnSe/ZnSeS quantum dots synthesized from ZnO" J. Phys. Chem. B. (2004) 108:17119-17123.

Clay, R.T. et al., "Synthesis of Cu and CuO nanoclusters within microphase-separated diblock copolymers" New J. Chem. (1998) 22(7):745-748.

Clay, R.T. et al., "Synthesis of metal nanoclusters within microphase-separated diblock copolymers: ICP-AES analysis of metal ion uptake" Supramolecular Science (1997) 4(1-2):113-119.

(56) References Cited

OTHER PUBLICATIONS

Dabbousi, B.O. et al., "(CdSe)ZnS core-shell quantum dots: Synthesis and characterization of a size series of highly luminescent nanocrystallites" J. Phys. Chem. B (1997) 101:9463-9475.

Ebenstein et al., "Fluorescence quantum yield of CdSe/ZnS nanocrystals investigated by correlated atomic-force and single-particle fluorescence microscopy" Appl Phys Lett (2002) 80(21):4033-4035.

Farina, V. et al., "Large rate accelerations in the stille reaction with tri-2-furylphosphine and triphenylarsine as palladium ligands: mechanistic and synthetic implications" J. Am. Chem. Soc. (1991) 113:9585-9595.

Franks, S. et al., "The preparation and properties of tertiary phosphines and tertiary phosphine oxides with long alkyl chains" J. Chem. Soc. Perkin (1979) 1:3029-3033.

Gelest, Inc. Catalog "Reactive silicones: forging new polymer links" (2004), pp. 25-27.

Guzelian, A.A. et al., "Colloidal chemical synthesis and characterization of InAs nanocrystal quantum dots" Appl. Phy. Lett (1996) 69(10): 1432-1434.

Guzelian, A.A. et al., "Synthesis of size-selected, surface passivated InP nanocrystals" J. Phys. Chem. (1996) 100:7212-7219.

Haubold, S. et al., "Strongly luminescent InP/ZnS core-shell nanoparticles" Chem. Phys. Chem. (2001) 5:331-334.

Hines, M.A. et al., "Bright UV-blue luminescent colloidal ZnSe nanocrystals" J. Phys. Chem. B. (1998) 102(19):3655-3657.

Hirai, T. et al., "Composite nano-CdS-polyurethane transparent films" J. Mater. Chem. (1999) 9:1217-1219.

Hirai, T. et al., "Effects of thiols on photocatlytic properties of nano-CdS-polythiourethane composite particles," J. Chem. Eng. Jap. (1998) 31(6):1003-1006.

Hirai, T. et al., "Preparation of nano-CdS-polyurethane composites via in situ polymerization in reverse micellar systems" J. Mater. Chem. (2000) 10:2234-2235.

Hirai, T. et al., "Preparation of semiconductor nanoparticle—polyurea composites using reverse micellar systems via an in situ diisocyanate polymerization" J. Phys. Chem. (1999) 103:10120-10126.

Ji, H.-L. et al., "Scope and diastereoselectivity of intramolecular [4 + 2] Diels-Alder cycloadditions within the coordination sphere of [($\eta_5$-$C_5H_5$)Ru(DMPP)$_{3-n}$(dienophile)$_N$]PF$_6$" Organometallics (1992) 11:1840-1855.

Kane, R.S. et al., "Synthesis of doped ZnS nanoclusters within block copolymer nanoreactors" Chem. Mat. (1999) 11(1):90-93.

Korgel, B.A. et al., "Controlled synthesis of mixed core and layered (Zn,Cd)S and (Hg,Cd)S nanocrystals within phosphatidylcholine vesicles" Langmuir (2000) 16:3588-3594.

Kost, D. et al., "The barrier to carbon-phosphorus bond rotation in tribenzoylphosphine. An experimental reinvestigation" Tet Lett (1979) 22:1983-1986.

Kyprianidou-Leodidou, T. et al., "Size variation of PbS particles in high-refractive-index nanocomposites" J. Phys. Chem. (1994) 98:8992-8997.

Lee, J. et al., "Full color emission from II-VI semiconductor quantum dot-polymer composites" Adv Mater (2000) 12(15): 1102-1105.

Lehmann, U. et al., "Palladium-catalyzed cross-coupling reactions between dihydrophyranylindium reagents and aryl halides. Synthesis of C-Arl glycals" Org. Lett (2003) 5(14):2405-2408.

Li, S.L. et al., "High quality ZnSe and ZnS nanocrystals formed by activating zinc carboxylate precursors" Nano Lett (2004) 4(11):2261-2264.

Li, Y. et al., White-light-emitting diodes using semiconductor nanocrystals Microchem Acta (2007) 159:207-215.

Lu, C. et al., "High refractive index thin films of ZnS/polythiourethane nanocomposites" J. Mater. Chem. (2003) 13:526-530.

Lucey, D.W. et al., "Monodispersed InP quantum dots prepared by colloidal chemistry in a noncoordinating solvent" Chem. Mater. (2005) 17:3754-3762.

Macdonell, G.D. et al., "The barrier to carbon-phosphorus bond rotation in triaroylphosphines" Tet Lett (1978) 10:857-860.

Malik, M.A. et al., "Synthesis and characterization of CdSe/CdS Core-shell and CdSe/CdS composites" Mat. Res. Soc. Symp. Proc. (2000) 581:291-296.

Malik, M.A. et al., "Synthesis and characterization of Mn doped CdS quantum dots from a single source precursor" Mat. Res. Soc. Symp. Proc. (2000) 581:133-138.

Manna, L. et al., "Shape control of colloidal semiconductor nanocrystals" J. Clus. Sci (2002) 13(4):521-532.

Mews, A. et al., "Preparation, characterization and photophysics of the quantum dot quantum well system CdS/HgS/CdS" J. Phys. Chem. (1994) 98:934-941.

Mews, A. et al., "Structural and spectroscopic investigations of CdS/HgS/CdS quantum-dot quantum wells" Phys. Rev. B. (1996) 53(20):R13242-R13245.

Micic, O.I. et al., "Core-shell quantum dots of lattice-matched ZnCdSe2 chells on InP cores: experiment and theory" J. Phys. Chem. B (2000) 104:12149-12156.

Micic, O.I. et al., "Synthesis and characterization of InP, GaP, and GaInP$_2$ quantum dots" J. Phys. Chem. (1995) 99:7754-7759.

Miinea, L.A. et al., "Indium fluoroalkoxide compounds" Inorg. Chem. (1999) 38:4447-4454.

Mulligan, R.F. et al., "Synthesis and characterization of ZnO nanostructures templates using diblock copolymers" J Appl Polymer Sci (2003) 89:1058-1061.

Mulligan, R.F. et al., "Synthesis of self-assembled metal-oxide nanostructures in diblock copolymer matrix and integration onto semiconductor surfaces" Mat. Res. Soc. Symp. Proc. (2001) 642:J2.11/1-J2.11/5.

Murray, C.B., et al., "Synthesis and characterization of nearly monodisperse CdE (E = sulfur, selenium, tellurium) semiconductor nanocrystallites," J. Am. Chem. Soc. 115(19):8706-8715 (1993).

Ogata, S. et al., "New preparation method for organic-inorganic layered compounds by organa derivatization reaction of Zn(OH)2 with carboxylic acids" J. Mat. Chem. (2000) 10(2):321-327.

Park, J.-J., et al., "Photopatternable Quantum Dots Forming Quasi-Ordered Arrays," Nano Letters (2010), 10(7) 2310-2317.

Peng, X., et al., "Epitaxial growth of highly luminescent CsDe/CdS core/shell nanocrystals with photostability and electronic accessibility," J. Am. Chem. Soc. 119(30):7019-7029 (1997).

Puntes, V.F. et al., "Colloidal nanocrystal shape and size control: The case of cobalt" Science (2001) 291:2115-2117.

Qi, L. et al., "Synthesis and characterization of mixed CdS-ZnS nanoparticles in reverse micelles" Colloids and Surfaces (1996) 111:195-202.

Reid, E. E. et al., "Organic Chemistry of Bivalent Sulfer," New York, Chemical Publishing Co., Inc. (1985) vol. 1, p. 33.

Robinson, H.D. et al., "Lateral coupling of self-assembled quantum dots studied by near-field spectroscopy" Mat. Res. Soc. Symp. Proc. (2000) 571:89-94.

Schiefer, M. et al., "Neutral and ionic aluminum, gallium, and indium compounds carrying two or three terminal ethynyl groups" Inorg. Chem. (2003) 42:4970-4976.

Shiojiri, S. et al., "Immobilization of semiconductor nanoparticles formed in reverse micelles into polyurea via in situ polymerization of diisocyanates" Chem. Commun. (1998) 1439-1440.

Shiojiri, S. et al., "Thiol-mediated immobilization of photocatalytic metal sulfide ultrafine particles formed in reverse micellar systems in polythiourethane" J. Chem. Eng. Jap. (1998) 31(3):425-433.

Smith, et al. "Minimizing the hydrodynamic size of quantum dots with multifunctional multidentate polymer ligands" JAGS (2008) 130(34):11278-11279.

Sohn, B. H. et al., "Processible optically transparent block copolymer films containing superparamagnetic iron oxide nanoclusters" Chem. Mat. (1997) 9(l):264-269.

Son, S.U. et al., "Facile synthesis of various phosphine-stabilized monodisperse palladium nanoparticles through the understanding of

(56) References Cited

OTHER PUBLICATIONS coordination of chemistry of nanoparticles" Nano Lett (2004) 4(6):1147-1151.

Talapin, D.V. et al. "Etching of colloidal InP nanocrystals with fluorides: photochemical nature of the process resulting in high photoluminescence efficiency" J. Phys. Chem. B. (2002) 106:12659-12663.

Technical Data Sheet for Zn0-350 from Sumitomo Osaka Cement 1995.

Tolbert, S.H. et al., "High-pressure structural transformation in semiconductor nanocrystals" Annu. Rev. Phys. Chem. (1995) 46:595-625.

Wells, R.L. et al. "Use of Tris(trimethylsilyl)arsine to prepare gallium arsenide and indium arsenide" Chem. of Mat. (1989) 1:4-6.

Xu, L. et al. "Reduced photo-instability of luminescence spectrum of core-shell CdSe/CdS nanocrystals" J. Mater. Sci (2000) 35:1375-1378.

Xu, S. et al. "Rapid synthesis of high-quality InP nanocrystals" J. Am. Chem. Soc. (2006) 128:1054-1055.

Yang, Y. et al., "Organic reactions in aqueous media, cyclopentadienylindium(l) as the first example of organoindium(l) reagent for carbon-carbon bond formation and the demonstration of one-pot tandem addition/intramolecular diels—alder reaction in aqueous media" J. Am. Chem. Soc. (2000) 122:402-403.

International Search Report and Written Opinion of the International Searching Authority for PCT/US2013/045244, mailed Nov. 14, 2013, 12 pages.

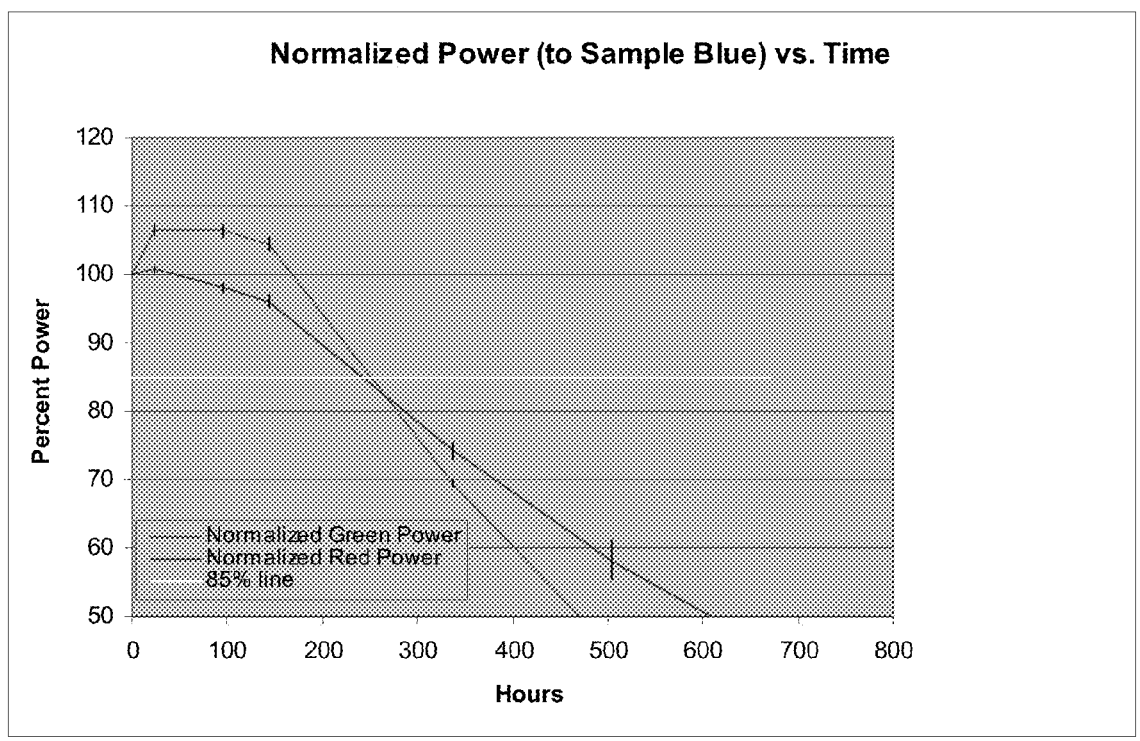

METHOD FOR SOLVENTLESS QUANTUM DOT EXCHANGE

CROSS-REFERENCES TO RELATED APPLICATIONS

This application claims priority to U.S. Provisional Application No. 61/781,285, filed Mar. 14, 2013, which is incorporated in its entirety herein for all purposes.

BACKGROUND OF THE INVENTION

High performance down-converting phosphor technologies will play a prominent role in the next generation of visible light emission, including high efficiency solid-state white lighting (SSWL). In addition, such technologies are also applicable to near infrared (NIR) and infrared (IR) light emitting technologies. Down-conversion from ultraviolet (UV) or blue light emitting semiconductor light emitting diodes (LEDs) into blue, red and green wavelengths offers a fast, efficient and cost-effective path for delivering commercially attractive white light sources. Unfortunately, existing rare-earth activated phosphors or halophosphates, which are currently the primary source for solid-state down-conversion, were originally developed for use in fluorescent lamps and cathode ray tubes (CRTs), and therefore have a number of critical shortfalls when it comes to the unique requirements of SSWL. As such, while some SSWL systems are available, poor power efficiency (<20 light lumens/watt (lm/W)), poor color rendering (Color Rendering Index (CRI)<75) and extremely high costs (>$200/kilolumen (klm)) limit this technology to niche markets such as flashlights and walkway lighting.

Furthermore, LEDs often suffer from reduced performance as a result of internal reflection of photons at the chip/coating interface. Typically, LEDs are encapsulated or coated in a polymeric material (which may comprise phosphors) to provide stability to the light-emitting chip. Currently these coatings are made by using an inorganic or organic coating that has a very different refractive index than the base material (i.e., the chip), which results in a detrimental optical effect due to the refractive index mismatch at the interface between the two materials. In addition, the temperature of the LED can reach in excess of 100° C. To allow for the expansion and contraction that can accompany this temperature rise, a compliant polymeric layer (e.g., silicone) is often placed in contact with the chip. In order to provide additional stability to the LED, this compliant layer is often further coated with a hard shell polymer.

The resulting LED structure suffers loss of light at the chip/compliant polymer interface due to the lower refractive index of the polymer coating in relation to the LED. However, if the refractive index of the compliant layer is increased, even greater loss will occur due at the high refractive index/low refractive index interface between the compliant polymer and the hard shell polymer due to internal reflection.

There are several critical factors which result in poor power efficiencies when using traditional inorganic phosphors for SSWL. These include: total internal reflection at the LED-chip and phosphor layer interface resulting in poor light extraction from the LED into the phosphor layer; poor extraction efficiency from the phosphor layer into the surroundings due to scattering of the light generated by the phosphor particles as well as parasitic absorption by the LED chip, metal contacts and housing; broad phosphor emission in the red wavelength range resulting in unused photons emitted into the near-IR; and poor down-conversion efficiency of the phosphors themselves when excited in the blue wavelength range (this is a combination of absorption and emission efficiency). While efficiencies improve with UV excitation, additional loss due to larger Stokes-shifted emission and lower efficiencies of LEDs in the UV versus the blue wavelength range makes this a less appealing solution overall.

As a result, poor efficiency drives a high effective ownership cost. The cost is also significantly impacted from the laborious manufacturing and assembly process to construct such devices, for example the heterogeneous integration of the phosphor-layer onto the LED-chip during packaging (DOE and Optoelectronics Industry Development Association "Light emitting diodes (LEDs) for general illumination," Technology Roadmap (2002)). Historically, blue LEDs have been used in conjunction with various band edge filters and phosphors to generate white light. However, many of the current filters allow photon emission from the blue end of the spectrum, thus limiting the quality of the white LED. The performance of the devices also suffer from poor color rendering due to a limited number of available phosphor colors and color combinations that can be simultaneously excited in the blue. There is a need therefore for efficient nanocomposite filters that can be tailored to filter out specific photon emissions in the visible (especially the blue end), ultraviolet and near infrared spectra.

While some development of organic phosphors has been made for SSWL, organic materials have several insurmountable drawbacks that make them unlikely to be a viable solution for high-efficiency SSWL. These include: rapid photo-degradation leading to poor lifetime, especially in the presence of blue and near-UV light; low absorption efficiency; optical scattering, poor refractive index matching at the chip-interface, narrow and non-overlapping absorption spectra for different color phosphors making it difficult or impossible to simultaneously excite multiple colors; and broad emission spectra. There exists a need therefore for a simple method for preparing polymeric layers that aid production of high quality, high intensity, white light. Surprisingly, the present invention meets this and other needs.

BRIEF SUMMARY OF THE INVENTION

In one embodiment, the present invention provides a method for replacing a first ligand on a quantum dot with a second ligand, including mixing a reaction mixture having a plurality of quantum dots having the first ligand non-covalently bound to the quantum dots, and a siloxane polymer having the second ligand, such that the second ligand displaces the first ligand and becomes non-covalently bound to the quantum dots, wherein the reaction mixture is substantially free of solvent such that no solvent removal step is required, and wherein the siloxane polymer has a $T_g$ of less than about 100° C. and a viscosity of less than about 1000 cSt, thereby replacing the first ligand on the quantum dot with the second ligand.

BRIEF DESCRIPTION OF THE DRAWINGS

FIG. 1 shows a graph for the normalized power (to sample blue) vs. time for the nanocrystal film of Example 3.

DETAILED DESCRIPTION OF THE INVENTION

I. General

The present invention provides an easy method for exchanging nanocrystal ligands used in the synthesis of the nanocrystals with ligands that improve solubility and ease processing of the nanocrystals. Previous ligand exchange methods utilize solvents such as toluene that must be removed. The method of the present invention minimizes the amount of solvent, thus avoiding the laborious solvent removal step. Instead of a solvent, the process uses a low viscosity siloxane polymer having suitable binding groups attached to the siloxane polymer. The combination of the low viscosity siloxane polymer and vigorous mixing allows the ligand exchange to occur without the need for a solvent.

II. Definitions

"Ligand" refers a moiety that stabilizes and solubilizes the quantum dots of the present invention. Representative ligands are those having amine, carboxy, or thiol groups that non-covalently bind to the quantum dots.

"Amine" refers to an —N(R)$_2$ group where the R groups can be hydrogen, alkyl, alkenyl, alkynyl, cycloalkyl, heterocycloalkyl, aryl, or heteroaryl, among others. The R groups can be the same or different. The amino groups can be primary (each R is hydrogen), secondary (one R is hydrogen) or tertiary (each R is other than hydrogen).

"Thiol" refers to an —SH group.

"Carboxy" refers to a carboxylic acid group of the formula —C(O)OH or —CO$_2$H. Carboxy groups can be attached to any suitable group, such as an alkyl group to form a carboxy alkyl.

"Phosphine" refers to a group of the formula —PR$_3$, where the R groups can be any suitable group such as hydrogen, alkyl or aryl. Phosphine can also be oxidized to form phosphine oxide having the formula —P(=O)R$_2$, where the R groups can be any suitable group such as hydrogen, alkyl or aryl.

"Quantum dot" or "nanocrystal" refers to nanostructures that are substantially monocrystalline. A nanocrystal has at least one region or characteristic dimension with a dimension of less than about 500 nm, and down to on the order of less than about 1 nm. As used herein, when referring to any numerical value, "about" means a value of ±10% of the stated value (e.g. about 100 nm encompasses a range of sizes from 90 nm to 110 nm, inclusive). The terms "nanocrystal," "quantum dot," "nanodot," and "dot," are readily understood by the ordinarily skilled artisan to represent like structures and are used herein interchangeably. The present invention also encompasses the use of polycrystalline or amorphous nanocrystals.

"Non-covalently bound" refers to two entities bound together via a non-covalent bond such as an ionic bond, hydrogen bonding, hydrophobic interactions, or via van der Waal's forces.

"Mixing a reaction mixture" refers to the process of mixing at least two distinct species such that they can react, either modifying one of the initial reactants or forming a third, distinct, species, a product. It should be appreciated, however, the resulting reaction product can be produced directly from a reaction between the added reagents or from an intermediate from one or more of the added reagents which can be produced in the reaction mixture.

"Siloxane polymer" or "polysiloxanes" refers to a polymer having a monomer repeat unit of the formula: —Si(R$_2$)O—. The R groups of the siloxane polymer can be the same or different, and can be any suitable group, including, but not limited to, hydrogen, alkyl, heteroalkyl, alkylamine, carboxyalkyl, alkenyl, alkynyl, cycloalkyl, heterocycloalkyl, aryl and heteroaryl. When both R groups are other than hydrogen, the siloxane polymer can be referred to as a "silicone." The siloxane polymers can be linear, branched or cyclic. The siloxane polymer can include a single type of monomer repeat unit, forming a homopolymer. Alternatively, the siloxane polymer can include two or more types of monomer repeat units to form a copolymer that can be a random copolymer or a block copolymer.

One embodiment of siloxane polymer is Genessee Polymers 988 (GP-988), a commercially available polymer from Genesee Polymers of Burton, Mich. GP-988 is a random copolymer where one comonomer includes an alkylamine group:

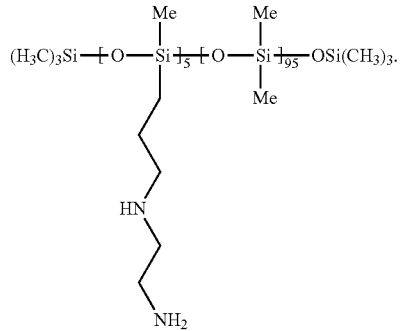

"Glass transition temperature" or "T$_g$" refers to the temperature at which an amorphous solid transitions from a solid, glassy, state to a more liquid state.

"Viscosity" refers to the resistance of a fluid to deformation. Viscosity can be defined as the shear viscosity, dynamic viscosity, kinematic viscosity or bulk viscosity, among others. Representative units include, but are not limited to, pascal-seconds (Pa·s, where pascal is equivalent to N·s/m$^2$ or kg·(m·s)$^{-1}$) or poise (P) which is equivalent to 0.1 Pa·s, and stokes (St) which is equivalent to 1 cm$^2$·s$^{-1}$ (water at 20° C. has a kinematic viscosity of about 1 cSt). Centistokes (cSt) are also commonly used and are equivalent to 1 mm$^2$·s$^{-1}$. The siloxane polymers useful in the present invention can have a viscosity less than about 1000 cSt. GP-988 has a viscosity of about 250 cSt.

"Alkyl" refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{1-12}$, $C_{1-14}$, $C_{1-16}$, $C_{1-18}$, $C_{1-20}$, $C_{8-20}$, $C_{12-20}$, $C_{14-20}$, $C_{16-20}$, and $C_{18-20}$. For example, $C_{1-6}$ alkyl includes, but is not limited to, methyl, ethyl, propyl, isopropyl, butyl, isobutyl, sec.butyl, tert-butyl, pentyl, isopentyl, hexyl, etc. Other alkyl groups include octane, nonane, decane, undecane, dodecane, tridecane, tetradecane, pentadecane, hexadecane, heptadecane, octadecane, nonadecane, and icosane. Alkyl groups can be substituted or unsubstituted.

"Heteroalkyl" refers to an alkyl group of any suitable length and having from 1 to 5 heteroatoms such as N, O and S. Additional heteroatoms can also be useful, including, but not limited to, B, Al, Si and P. The heteroatoms can also be oxidized, such as, but not limited to, —S(O)— and —S(O)$_2$—. For example, heteroalkyl can include ethers (ethyleneoxy and poly(ethyleneoxy)), thioethers and alkylamines. The heteroatom portion of the heteroalkyl can replace a hydrogen of the alkyl group to form a hydroxy, thio or amino group. Alternatively, the heteroatom portion can be the connecting atom, or be inserted between two carbon atoms.

"Alkylamine" refers to an amine linked to an alkyl, as described above, and generally having the formula —C$_{1-8}$ alkyl-NR$_2$. The alkyl moiety of the alkylamine group is linked to the siloxane polymer of the present invention. Any suitable alkyl chain is useful. The R groups attached to the nitrogen atom can be any suitable group, including hydrogen and alkyl. Moreover, the R groups can be the same or different. Alkylamine can also include longchain alkyl groups where the alkyl group can be $C_{8-20}$.

"Carboxyalkyl" refers to a carboxy group linked to an alkyl, as described above, and generally having the formula —$C_{1-8}$ alkyl-C(O)OH. The alkyl moiety of the carboxyalkyl group is linked to the siloxane polymer of the present invention. Any suitable alkyl chain is useful. Carboxyalkyl can also include fatty acids where the alkyl group can be from 8 to 30 carbon atoms. Examples of fatty acids useful in the present invention, include, but are not limited to, caprylic acid (C8), capric acid (C10), lauric acid (C12), myristic acid (C14), palmitic acid (C16), palmitoleic acid (C16), stearic acid (C18), isostearic acid (C18), oleic acid (C18), vaccenic acid (C18), linoleic acid (C18), alpha-linoleic acid (C18), gamma-linolenic acid (C18), arachidic acid (C20), gadoleic acid (C20), arachidonic acid (C20), eicosapentaenoic acid (C20), behenic acid (C22), erucic acid (C22), docosahexaenoic acid (C22), lignoceric acid (C24) and hexacosanoic acid (C26).

"Alkenyl" refers to a straight chain or branched hydrocarbon having at least 2 carbon atoms and at least one double bond. Alkenyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Alkenyl groups can have any suitable number of double bonds, including, but not limited to, 1, 2, 3, 4, 5 or more. Examples of alkenyl groups include, but are not limited to, vinyl (ethenyl), propenyl, isopropenyl, 1-butenyl, 2-butenyl, isobutenyl, butadienyl, 1-pentenyl, 2-pentenyl, isopentenyl, 1,3-pentadienyl, 1,4-pentadienyl, 1-hexenyl, 2-hexenyl, 3-hexenyl, 1,3-hexadienyl, 1,4-hexadienyl, 1,5-hexadienyl, 2,4-hexadienyl, or 1,3,5-hexatrienyl. Alkenyl groups can be substituted or unsubstituted.

"Alkynyl" refers to either a straight chain or branched hydrocarbon having at least 2 carbon atoms and at least one triple bond. Alkynyl can include any number of carbons, such as $C_2$, $C_{2-3}$, $C_{2-4}$, $C_{2-5}$, $C_{2-6}$, $C_{2-7}$, $C_{2-8}$, $C_{2-9}$, $C_{2-10}$, $C_{2-12}$, $C_{2-14}$, $C_{2-16}$, $C_{2-18}$, $C_{2-20}$, $C_{8-20}$, $C_{12-20}$, $C_{14-20}$, $C_{16-20}$, and $C_{18-20}$. Examples of alkynyl groups include, but are not limited to, acetylenyl, propynyl, 1-butynyl, 2-butynyl, isobutynyl, sec-butynyl, butadiynyl, 1-pentynyl, 2-pentynyl, isopentynyl, 1,3-pentadiynyl, 1,4-pentadiynyl, 1-hexynyl, 2-hexynyl, 3-hexynyl, 1,3-hexadiynyl, 1,4-hexadiynyl, 1,5-hexadiynyl, 2,4-hexadiynyl, or 1,3,5-hexatriynyl. Alkynyl groups can be substituted or unsubstituted.

"Cycloalkyl" refers to a saturated or partially unsaturated, monocyclic, fused bicyclic or bridged polycyclic ring assembly containing from 3 to 12 ring atoms, or the number of atoms indicated. Cycloalkyl can include any number of carbons, such as $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, $C_{3-12}$, $C_{6-10}$, or $C_{6-12}$ Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbornane, [2.2.2]bicyclooctane, decahydronaphthalene and adamantane. Cycloalkyl groups can also be partially unsaturated, having one or more double or triple bonds in the ring. Representative cycloalkyl groups that are partially unsaturated include, but are not limited to, cyclobutene, cyclopentene, cyclohexene, cyclohexadiene (1,3- and 1,4-isomers), cycloheptene, cycloheptadiene, cyclooctene, cyclooctadiene (1,3-, 1,4- and 1,5-isomers), norbornene, and norbornadiene. When cycloalkyl is a saturated monocyclic $C_{3-8}$ cycloalkyl, exemplary groups include, but are not limited to cyclopropyl, cyclobutyl, cyclopentyl, cyclohexyl, cycloheptyl and cyclooctyl. When cycloalkyl is a saturated monocyclic $C_{3-6}$ cycloalkyl, exemplary groups include, but are not limited to cyclopropyl, cyclobutyl, cyclopentyl, and cyclohexyl. Cycloalkyl groups can be substituted or unsubstituted.

"Heterocycloalkyl" refers to a saturated ring system having from 3 to 12 ring members and from 1 to 4 heteroatoms of N, O and S. Additional heteroatoms can also be useful, including, but not limited to, B, Al, Si and P. The heteroatoms can also be oxidized, such as, but not limited to, —S(O)— and —S(O)$_2$—. Heterocycloalkyl groups can include any number of ring atoms, such as, 3 to 6, 4 to 6, 5 to 6, 3 to 8, 4 to 8, 5 to 8, 6 to 8, 3 to 9, 3 to 10, 3 to 11, or 3 to 12 ring members. Any suitable number of heteroatoms can be included in the heterocycloalkyl groups, such as 1, 2, 3, or 4, or 1 to 2, 1 to 3, 1 to 4, 2 to 3, 2 to 4, or 3 to 4. The heterocycloalkyl group can include groups such as aziridine, azetidine, pyrrolidine, piperidine, azepane, azocane, quinuclidine, pyrazolidine, imidazolidine, piperazine (1,2-, 1,3- and 1,4-isomers), oxirane, oxetane, tetrahydrofuran, oxane (tetrahydropyran), oxepane, thiirane, thietane, thiolane (tetrahydrothiophene), thiane (tetrahydrothiopyran), oxazolidine, isoxazolidine, thiazolidine, isothiazolidine, dioxolane, dithiolane, morpholine, thiomorpholine, dioxane, or dithiane. The heterocycloalkyl groups can also be fused to aromatic or non-aromatic ring systems to form members including, but not limited to, indoline. Heterocycloalkyl groups can be unsubstituted or substituted. For example, heterocycloalkyl groups can be substituted with $C_{1-6}$ alkyl or oxo (=O), among many others.

"Aryl" refers to an aromatic ring system having any suitable number of ring atoms and any suitable number of rings. Aryl groups can include any suitable number of ring atoms, such as, 6, 7, 8, 9, 10, 11, 12, 13, 14, 15 or 16 ring atoms, as well as from 6 to 10, 6 to 12, or 6 to 14 ring members. Aryl groups can be monocyclic, fused to form bicyclic or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted.

"Heteroaryl" refers to a monocyclic or fused bicyclic or tricyclic aromatic ring assembly containing 5 to 16 ring atoms, where from 1 to 5 of the ring atoms are a heteroatom such as N, O or S. Additional heteroatoms can also be useful, including, but not limited to, B, Al, Si and P. The heteroatoms can also be oxidized, such as, but not limited to, —S(O)— and —S(O)$_2$—. Heteroaryl groups can include any number of ring atoms, such as, 3 to 6, 4 to 6, 5 to 6, 3 to 8, 4 to 8, 5 to 8, 6 to 8, 3 to 9, 3 to 10, 3 to 11, or 3 to 12 ring members. Any suitable number of heteroatoms can be included in the heteroaryl groups, such as 1, 2, 3, 4, or 5, or 1 to 2, 1 to 3, 1 to 4, 1 to 5, 2 to 3, 2 to 4, 2 to 5, 3 to 4, or 3 to 5. Heteroaryl groups can have from 5 to 8 ring members and from 1 to 4 heteroatoms, or from 5 to 8 ring members and from 1 to 3 heteroatoms, or from 5 to 6 ring members and from 1 to 4 heteroatoms, or from 5 to 6 ring members and from 1 to 3 heteroatoms. The heteroaryl group can include groups such as pyrrole, pyridine, imidazole, pyrazole, triazole, tetrazole, pyrazine, pyrimidine, pyridazine, triazine (1,2,3-, 1,2,4- and 1,3,5-isomers), thiophene, furan, thiazole, isothiazole, oxazole, and isoxazole. The heteroaryl groups can also be fused to aromatic ring systems, such as a phenyl ring, to form members including, but not limited to, benzopyrroles such as indole and isoindole, benzopyridines such as quinoline and isoquinoline, benzopyrazine (quinoxaline), benzopyrimidine (quinazoline), benzopyridazines such as phthalazine and cinnoline, benzothiophene, and benzofuran. Other heteroaryl groups include heteroaryl rings linked by a bond, such as bipyridine. Heteroaryl groups can be substituted or unsubstituted.

III. Solventless Ligand Exchange

The present invention is drawn to a method for exchanging ligands on quantum dots without the use of solvent. In place of the solvent, a low viscosity siloxane polymer is used where the siloxane polymer is the replacement ligand. In some embodiments, the present invention provides a method for replacing a first ligand on a quantum dot with a second ligand, including mixing a reaction mixture having a plurality of quantum dots having the first ligand non-covalently bound to the quantum dots, and a siloxane polymer having the second ligand, such that the second ligand displaces the first ligand and becomes non-covalently bound to the quantum dots, wherein the reaction mixture is substantially free of solvent such that no solvent removal step is required, and wherein the siloxane polymer has a $T_g$ of less than about 100° C. and a viscosity of less than about 1000 cSt, thereby replacing the first ligand on the quantum dot with the second ligand.

First Ligands

The first ligand can be any suitable ligand, such as an amine (primary, secondary or tertiary), carboxy, thiol, phosphine or phospine oxide. In some embodiments, the first ligand can be an amine, carboxy, thiol, phosphine or phosphine oxide. In some embodiments, the first ligand can be an amine, carboxy or thiol.

When the first ligand is an amine, the amine can be an alkylamine. In some embodiments, the first ligand can be a primary amine or a secondary amine. In some other embodiments, the first ligand can be a primary amine. Representative amines include, but are not limited to, octylamine, decylamine, dodecylamine, dodecylamine, tetradecylamine or hexadecylamine. In some embodiments, the first ligand can be decylamine.

When the first ligand is a carboxy, the carboxy can be a carboxyalkyl. In some embodiments, the first ligand can be a carboxy. Representative carboxy groups include, but are not limited to, caprylic acid, capric acid, lauric acid, myristic acid and palmitic acid. In some embodiments, the first ligand can be lauric acid.

Any suitable phosphine or phosphine oxide can be used as the first ligand in the present invention. In some embodiments, the first ligand can be a phosphine or phosphine oxide. Representative phosphines and phosphine oxides include, but are not limited to, trihexylphosphine, trioctylphosphine (TOP), tridecylphosphine, trihexylphosphine oxide, trioctylphosphine oxide (TOPO), tridecylphosphine oxide. In some embodiments, the first ligand can be trioctylphosphine or trioctylphosphine oxide. Representative first ligands include, but are not limited to, decylamine, lauric acid, trioctylphosphine, and trioctylphosphine oxide.

Siloxane Polymer

The siloxane polymer can be any suitable siloxane polymer having a glass transition temperature less than 100° C., a viscosity less than 1000 cSt and a functional group suitable for binding to the quantum dots and capable of replacing the first binding ligand. Siloxane polymers are characterized by having an —Si—O—Si— backbone, and are represented by the general formula —Si(R$_2$)O—, where the R groups can be the same or different, and can be any suitable group, including, but not limited to, hydrogen, alkyl, heteroalkyl, alkylamine, carboxyalkyl, alkenyl, alkynyl, cycloalkyl, heterocloalkyl, aryl and heteroaryl. The siloxane polymers can be linear, branched or cyclic. The siloxane polymer can include a single type of monomer repeat unit, forming a homopolymer. Alternatively, the siloxane polymer can include two or more types of monomer repeat units to form a copolymer that can be a random copolymer or a block copolymer.

Suitable siloxane polymers are available commercially from Genesee Polymers of Burton, Mich. or Gelest of Morrisville, Pa. Alternatively, siloxane polymers can be prepared using methods known to one of skill in the art. Whether the siloxane polymer is obtained from commercial sources or prepared de novo, the siloxane polymer can be of any suitable molecular weight, glass transition temperature and viscosity, as long as it contains a ligand suitable for binding to quantum dots. Suitable ligands include, but are not limited to, amines, carboxy and thiol groups, capable of binding to the quantum dot via hydrogen-bonding, hydrophobic interactions or van der Waal's forces. In some embodiments, the siloxane polymer includes amine or carboxy binding groups as the second ligand. In other embodiments, the siloxane polymer includes amine binding groups as the second ligand. In some other embodiments, the siloxane polymer includes carboxy binding groups as the second ligand.

In some embodiments, the siloxane polymer can be Genesee Polymers 988:

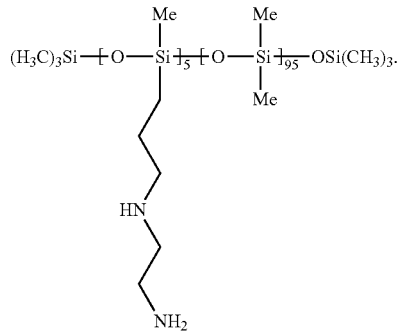

Siloxane polymers typically have a low glass transition temperature and a low viscosity, depending on the size of the polymer and the groups pendant to the polymer backbone. For example, the siloxane polymers of the present invention can have a glass transition temperature of less than about 100° C., or 90, 80, 70, 60, 50, 40, 30, 25, 20, 15, 10, 5 or 0° C. In some embodiments, the siloxane polymer can have a glass transition temperature of less than about 50° C. In other embodiments, the siloxane polymer can have a glass transition temperature of less than about 25° C.

The siloxane polymers of the present invention can have any suitable viscosity. For example, the siloxane polymer can have a viscosity of less than about 5000 cSt, 4000, 3000, 2000, 1000, 900, 800, 700, 600, 500, 400, 300, 250, 200, 150, 100, 50 or about 1 cSt. In some embodiments, the siloxane polymer can have a viscosity of less than about 1000 cSt. In other embodiments, the siloxane polymer can have a viscosity of less than about 500 cSt. In some other embodiments, the siloxane polymer can have a viscosity of less than about 250 cSt.

In some embodiments, the siloxane polymer has the structure of formula I:

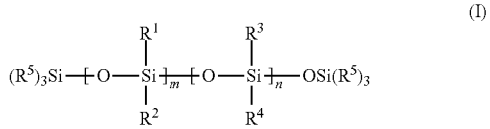

(I)

wherein each $R^1$, $R^3$, $R^4$ and $R^5$ can independently be $C_{1-8}$ alkyl, cycloalkyl or aryl; each $R^2$ can independently be $C_{1-8}$ heteroalkyl, $C_{2-8}$ alkylamine and $C_{2-8}$ carboxyalkyl; subscript m can be an integer from 1 to 500; and subscript n can be an integer from 0 to 500.

Any suitable number of subscripts m and n can be present in the siloxane polymers of formula I. For example, the number of subscripts m and n can be from about 1 to about 500, or from about 5 to about 100, or from about 5 to about 50, or from about 10 to about 50, or from about 10 to about 25. Alternatively, the number of subscripts m and n can be about 5, 10, 15, 20, 25, 30, 40, 50, 60, 70, 80, 90 or about 100.

Any suitable ratio of subscripts m and n can be present in the quantum dot binding-ligands of the present invention. When m and n are both greater than 0, the ratio of subscript m to n can be from about 100:1, 90:1, 80:1, 75:1, 70:1, 60:1, 50:1, 40:1, 30:1, 25:1, 20:1, 15:1 10:1, 5:1, 4:1, 3:1, 2.5:1 2:1, 1:1, 1:2, 1:2.5, 1:3, 1:4, 1:5, 1:10, 1:15, 1:20, 1:25, 1:30, 1:40, 1:50, 1:60, 1:70, 1:75, 1:80, 1:90 or about 1:100. In some embodiments, the ratio of subscript m to subscript n is from about 1:100 to about 1:1. In other embodiments, the ratio of subscript m to subscript n is from about 1:100 to about 1:10. In some other embodiments, the ratio of subscript m to subscript n is from about 1:50 to about 1:10. In still other embodiments, the ratio of subscript m to subscript n is about 1:20.

The siloxane polymer can have any suitable molecular weight. For example, the siloxane polymer can have a molecular weight of from about 1000 Daltons (Da) to about 20 kDa, or a molecular weight of about 1 kDa, 2, 3, 4, 5, 6, 7, 8, 9, 10, 15 or 20 kDa.

The siloxane polymer can be present in any suitable amount. For example, the siloxane polymer can be present in an amount that is more than, about the same as, or less than (weight/weight) compared to the quantum dots. In some embodiments, siloxane polymer can be present in an amount of 1%, 2, 3, 4, 5, 6, 7, 8, 9, 10, 15, 20, 25, 30, 35, 40, 45, 50, 60, 70, 80, 90, 95, 96, 97, 98 or 99% (weight/weight) of the reaction mixture.

Quantum Dots

Any suitable quantum dot can be used in the present invention. The QDs can be substantially homogenous in material properties, or in certain embodiments, can be heterogeneous. The optical properties of QDs can be determined by their particle size, chemical or surface composition; and/or by suitable optical testing available in the art. The ability to tailor the nanocrystal size in the range between about 1 nm and about 15 nm enables photoemission coverage in the entire optical spectrum to offer great versatility in color rendering. Particle encapsulation offers robustness against chemical and UV deteriorating agents.

Additional exemplary nanostructures include, but are not limited to, nanowires, nanorods, nanotubes, branched nanostructures, nanotetrapods, tripods, bipods, nanoparticles, and similar structures having at least one region or characteristic dimension (optionally each of the three dimensions) with a dimension of less than about 500 nm, e.g., less than about 200 nm, less than about 100 nm, less than about 50 nm, or even less than about 20 nm or less than about 10 nm. Typically, the region or characteristic dimension will be along the smallest axis of the structure. Nanostructures can be, e.g., substantially crystalline, substantially monocrystalline, polycrystalline, amorphous, or a combination thereof.

QDs (or other nanostructures) for use in the present invention can be produced using any method known to those skilled in the art. For example, suitable QDs and methods for forming suitable QDs include those disclosed in: U.S. Pat. No. 6,225, 198, U.S. Pat. No. 6,207,229, U.S. Pat. No. 6,322,901, U.S. Pat. No. 6,872,249, U.S. Pat. No. 6,949,206, U.S. Pat. No. 7,572,393, U.S. Pat. No. 7,267,865, U.S. Pat. No. 7,374,807, US Patent Publication No. 2008/0118755, filed Dec. 9, 2005, and U.S. Pat. No. 6,861,155, each of which is incorporated by reference herein in its entirety.

The QDs (or other nanostructures) for use in the present invention can be produced from any suitable material, suitably an inorganic material, and more suitably an inorganic conductive or semiconductive material. Suitable semiconductor materials include any type of semiconductor, including group II-VI, group III-V, group IV-VI and group IV semiconductors. Suitable semiconductor materials include, but are not limited to, Si, Ge, Sn, Se, Te, B, C (including diamond), P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such semiconductors.

In some embodiments, the semiconductor nanocrystals or other nanostructures can also include a dopant, such as a p-type dopant or an n-type dopant. The nanocrystals (or other nanostructures) useful in the present invention can also include II-VI or III-V semiconductors. Examples of II-VI or III-V semiconductor nanocrystals and nanostructures include any combination of an element from Group II, such as Zn, Cd and Hg, with any element from Group VI, such as S, Se, Te, Po, of the Periodic Table; and any combination of an element from Group III, such as B, Al, Ga, In, and Tl, with any element from Group V, such as N, P, As, Sb and Bi, of the Periodic Table. Other suitable inorganic nanostructures include metal nanostructures. Suitable metals include, but are not limited to, Ru, Pd, Pt, Ni, W, Ta, Co, Mo, Ir, Re, Rh, Hf, Nb, Au, Ag, Ti, Sn, Zn, Fe, FePt, and the like.

While any method known to the ordinarily skilled artisan can be used to create nanocrystal phosphors, suitably, a solution-phase colloidal method for controlled growth of inorganic nanomaterial phosphors is used. See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J. Am. Chem. Soc. 115:8706 (1993), the disclosures of which are incorporated by reference herein in their entireties. This manufacturing process technology leverages low cost processability without the need for clean rooms and expensive manufacturing equipment. In these methods, metal precursors that undergo pyrolysis at high temperature are rapidly injected into a hot solution of organic surfactant molecules. These precursors break apart at elevated temperatures and react to nucleate nanocrystals. After this initial nucleation phase, a growth phase begins by the addition of monomers to the growing crystal. The result is freestanding crystalline nanoparticles in solution that have an organic surfactant molecule coating their surface.

Utilizing this approach, synthesis occurs as an initial nucleation event that takes place over seconds, followed by crystal growth at elevated temperature for several minutes. Parameters such as the temperature, types of surfactants present, precursor materials, and ratios of surfactants to monomers can be modified so as to change the nature and progress of the reaction. The temperature controls the structural phase of the nucleation event, rate of decomposition of precursors, and rate of growth. The organic surfactant molecules mediate both solubility and control of the nanocrystal shape. The ratio of surfactants to monomer, surfactants to each other, monomers to each other, and the individual concentrations of monomers strongly influence the kinetics of growth.

In semiconductor nanocrystals, photo-induced emission arises from the band edge states of the nanocrystal. The bandedge emission from luminescent nanocrystals competes with radiative and non-radiative decay channels originating from surface electronic states. X. Peng, et al., J. Am. Chem. Soc. 30:7019-7029 (1997). As a result, the presence of surface defects such as dangling bonds provide non-radiative recombination centers and contribute to lowered emission efficiency. An efficient and permanent method to passivate and remove the surface trap states is to epitaxially grow an inorganic shell material on the surface of the nanocrystal. X. Peng, et al., J. Am. Chem. Soc. 30:7019-7029 (1997). The shell material can be chosen such that the electronic levels are type I with respect to the core material (e.g., with a larger bandgap to provide a potential step localizing the electron and hole to the core). As a result, the probability of non-radiative recombination can be reduced.

Core-shell structures are obtained by adding organometallic precursors containing the shell materials to a reaction mixture containing the core nanocrystal. In this case, rather than a nucleation-event followed by growth, the cores act as the nuclei, and the shells grow from their surface. The temperature of the reaction is kept low to favor the addition of shell material monomers to the core surface, while preventing independent nucleation of nanocrystals of the shell materials. Surfactants in the reaction mixture are present to direct the controlled growth of shell material and ensure solubility. A uniform and epitaxially grown shell is obtained when there is a low lattice mismatch between the two materials.

Exemplary materials for preparing core-shell luminescent nanocrystals include, but are not limited to, Si, Ge, Sn, Se, Te, B, C (including diamond), P, Co, Au, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $(Al, Ga, In)_2 (S, Se, Te)_3$, $Al_2CO_3$, and appropriate combinations of two or more such materials. Exemplary core-shell luminescent nanocrystals for use in the practice of the present invention include, but are not limited to, (represented as Core/Shell), CdSe/ZnS, InP/ZnS, PbSe/PbS, CdSe/CdS, CdTe/CdS, CdTe/ZnS, as well as others.

In some embodiments, CdSe is used as the nanocrystal material, due to the relative maturity of the synthesis of this material. Due to the use of a generic surface chemistry, it is also possible to substitute non-cadmium-containing nanocrystals. Exemplary luminescent nanocrystal materials include CdSe or ZnS, including core/shell luminescent nanocrystals comprising CdSe/CdS/ZnS, CdSe/ZnS, CdSeZn/CdS/ZnS, CdSeZn/ZnS, InP/ZnS, PbSe/PbS, CdSe/ CdS, CdTe/CdS or CdTe/ZnS. Most preferably, the quantum dots of the present invention can include core-shell QDs having a core including CdSe and at least one encapsulating shell layer including CdS or ZnS. In other embodiments, InP is used as the nanocrystal material.

In some embodiments, the quantum dot can be group II-VI, group III-V, group IV-VI or group IV semiconductors. In other embodiments, the quantum dot can be Si, Ge, Sn, Se, Te, B, C, P, BN, BP, BAs, AlN, AlP, AlAs, AlSb, GaN, GaP, GaAs, GaSb, InN, InP, InAs, InSb, AlN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2$, $Ga_2$, $In_2$, $S_3$, $Se_3$, $Te_3$, or $Al_2CO_3$. In some other embodiments, the quantum dot can include CdSe, CdTe or InP.

The luminescent nanocrystals can be made from a material impervious to oxygen, thereby simplifying oxygen barrier requirements and photostabilization of the QDs in the QD phosphor material. In some embodiments, the luminescent nanocrystals can be coated with one or more quantum dot binding-ligand of the present invention and dispersed in an organic polymeric matrix having one or more matrix materials, as discussed in more detail below. The luminescent nanocrystals can be further coated with one or more inorganic layers having one or more material such as a silicon oxide, an aluminum oxide, or a titanium oxide (e.g., $SiO_2$, $Si_2O_3$, $TiO_2$, or $Al_2O_3$), to hermetically seal the QDs.

The quantum dot compositions of the present invention can be used to form a lighting device such as a backlighting unit (BLU). A typical BLU can include a QD film sandwiched between two barrier layers. QD films of the present invention can include a single quantum dot and a single quantum-dot binding-ligand, or a plurality of quantum dots and a plurality of quantum-dot binding-ligands. For example, a QD film of the present invention can include a cadmium quantum dot, such as CdS, CdTe, CdSe, CdSe/CdS, CdTe/CdS, CdTe/ZnS, CdSe/CdS/ZnS, CdSe/ZnS, CdSeZn/CdS/ZnS, or CdSeZn/ZnS, and a quantum-dot binding ligand having amine binding groups. The QD films of the present invention can include an InP quantum dot, such as InP or InP/ZnS, and a quantum-dot binding ligand having carboxy binding groups.

In some embodiments, the QD films of the present invention include both cadmium and indium containing quantum dots. When both cadmium and indium containing quantum dots are present, the QD film can include a first film containing the cadmium quantum dots and a second film containing the indium quantum dots. These films can then be stacked one on top of another to form a layered film. In some embodiments, a barrier film or other type of film can be stacked in between each of the cadmium and indium films. In other embodiments, the cadmium and indium quantum dots are mixed together in a single QD film with their respective quantum-dot binding-ligands.

Mixed QD films, with either a single layer or multi-layer film, have the advantage of reducing the amount of cadmium in the system. For example, the cadmium can be reduced below 300 ppm, 200, 100, 75, 50 or 25 ppm. In some embodiments, the QD film contains less than about 100 ppm cadmium. In other embodiments, the QD film contains less than about 50 ppm.

Other Process Factors

The method of the present invention can be practiced under any suitable conditions, such as temperature, time, pressure, atmosphere and light. For example, any suitable mixing apparatus can be used. In some embodiments, the mixing can be by magnetic or mechanical stirring.

The method of the present invention can be performed at any suitable temperature. For example, the method can be performed at a temperature of below room temperature, at room temperature or above room temperature. In some embodiments, the temperature can be about 25° C., or 30, 40, 50, 60, 70, 75, 80, 90, or 100° C. In other embodiments, the reaction mixture can be heated to at least about 50° C. In some other embodiments, the reaction mixture can be heated to at least about 75° C. Other temperatures are useful in the method of the present invention and are recognized by one of skill in the art.

The method of the present invention can be performed for any suitable period of time. For example, the method can be performed for 10 minutes, 15, 20, 25, 30, 45, or 60 minutes, as well as for 1 hour, 2, 3, 4, 5 or more hours. In some embodiments, the mixing can be performed for at least about 30 minutes. In other embodiments, the mixing can be performed for at least about 1 hour. In some other embodiments, the mixing can be performed for at least about 2 hours.

The method of the present invention can be performed at any suitable pressure. For example, the pressure can be at about atmospheric pressure, below atmospheric pressure or above atmospheric pressure. Atmospheric pressure is defined to be about 14.7 lbs·in$^{-2}$ (psi), about 101 kilopascal (kPa) and about 1 bar. In some embodiments, the mixing can be performed at about atmospheric pressure.

Any suitable atmosphere can be used in the method of the present invention. For example, the atmosphere can be an inert atmosphere or a non-inert atmosphere. An inert atmosphere can be provided by gasses such as nitrogen or argon, among others. A non-inert atmosphere includes the atmosphere at sea level. In some embodiments, the atmosphere is an inert atmosphere. Other atmospheres are useful in the methods of the present invention.

The method of the present invention can be performed under any suitable light conditions. For example, the method can be performed in the dark, under limited light conditions where specific wavelengths of light are excluded, or without any precautions being taken to exclude light.

IV. Examples

Example 1

GP-988 and Green Nanocrystal Paste

After the shell synthesis, the toluene nanocrystal solution is washed in 2× volume of ethanol, where the nanocystals precipitate, and settle into a compact cake using a centrifuge. The wash solvent is then decanted off of the wet cake, and the pasty cake is then used in the exchange. For QD synthesis and shelling references, See Alivisatos, A. P., "Semiconductor clusters, nanocrystals, and quantum dots," Science 271:933 (1996); X. Peng, M. Schlamp, A. Kadavanich, A. P. Alivisatos, "Epitaxial growth of highly luminescent CdSe/CdS Core/Shell nanocrystals with photostability and electronic accessibility," J. Am. Chem. Soc. 30:7019-7029 (1997); and C. B. Murray, D. J. Norris, M. G. Bawendi, "Synthesis and characterization of nearly monodisperse CdE (E=sulfur, selenium, tellurium) semiconductor nanocrystallites," J. Am. Chem. Soc. 115:8706 (1993), X. Peng, et al., J. Am. Chem. Soc. 30:7019-7029 (1997).

1.5 g GP-988 was added to green nanocrystal paste (from 15 mL washed nanocrystal, which was decanted of its wash solvent), stirred well with a spatula, and then a stir bar while heating to 90° C. for 2 hours. The solution was cooled to room temperature and decanted to another vial. A typical weight ratio for green would be 0.8 g paste in 8.0 g GP988, and for red is 0.12 g paste in 6.0 g GP988. Quantum yield measurements of exchanged green polymer 323-13E measured 86.8% and red 323-013F was 87.2%, in spec for solvent exchanged material. A film made with the green polymer and red polymer above, mixed in amine cured epoxy resin (Epic 91) and thermally cured showed 280 hr lifetime on an accelerated testing platform (lightbox III) which is in the range of standard solvent processed material films.

The final optical density (OD) can be varied based on the amount of nanocrystal (NC) paste to ligand polymer. OD is the absorbance at 460 nm at a fixed path length (usually 1 cm). The OD of the NC growth solution is measured before washing and is used to calculate the amount of polymer used in the exchange, by the relationship: V×OD=V×OD. Growth solutions before washing are typically 8-20 OD. The desired OD of the final siloxane material may be in the range of 30-80 OD. So 1000 mL of a 12 OD growth solution is washed, compacted via centrifuge, and decanted to a wet cake paste. The amount of paste that results is usually ~0.5-5.0% of the volume of the original NC solution before washing. If the desired final OD is ~50, then 240 mL of GP988 would be used in the exchange (1000×12=240×50). There are often some losses in washing and exchange, so a higher OD is typically targeted which can then be diluted later with ligand polymer to the desired final OD.

The QD paste can also be added to the GP988 fluid as well (order of addition can be reversed), which may be preferred depending on the dispensing and mixing apparatuses available.

Example 2

GP-988 and Red Nanocrystal Paste 2.25 g GP-988 was added to red nanocrystal paste (from 15 mL washed nanocrystal, which was decanted of its wash solvent), stirred well with a spatula, and then a stir bar while heating to 90° C. for 2 hours. The solution was cooled to room temperature and decanted to another vial.

Example 3

Preparation of Nanocrystal Film

A film was made from green concentrate in Example 1 and red concentrate in Example 2 in Epic 91 epoxy. The accelerated reliability test shows similar stability to POR ESH films, specifically, 275 hr lifetime on an accelerated testing platform (lightbox III) which is in the range of standard solvent processed material films Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method for replacing a first ligand on a quantum dot with a second ligand, the method comprising:
   mixing a reaction mixture comprising a plurality of quantum dots having the first ligand non-covalently bound to the quantum dots, and a siloxane polymer comprising the second ligand, such that the second ligand displaces the first ligand and becomes non-covalently bound to the quantum dots without using solvent, and wherein the siloxane polymer has a $T_g$ of less than about 100° C. and a viscosity of less than about 1000 cSt, thereby replacing the first ligand on the quantum dot with the second ligand.

2. The method of claim 1, wherein the first ligand is selected from the group consisting of amine, carboxylic acid, thiol, phosphine and phosphine oxide.

3. The method of claim 1, wherein the first ligand comprises a primary amine.

4. The method of claim 1, wherein the quantum dot is selected from the group consisting of group II-VI, group III-V, group IV-VI and group IV semiconductors.

5. The method of claim 1, wherein the quantum dot is selected from the group consisting of Si, Ge, Sn, Se, Te, B, C, P, BN, BP, BAs, AlN, AlP, AlAs, AlSb, GaN, GaP, GaAs, GaSb, InN, InP, InAs, InSb, MN, AlP, AlAs, AlSb, GaN, GaP, GaAs, GaSb, ZnO, ZnS, ZnSe, ZnTe, CdS, CdSe, CdSeZn, CdTe, HgS, HgSe, HgTe, BeS, BeSe, BeTe, MgS, MgSe, GeS, GeSe, GeTe, SnS, SnSe, SnTe, PbO, PbS, PbSe, PbTe, CuF, CuCl, CuBr, CuI, $Si_3N_4$, $Ge_3N_4$, $Al_2O_3$, $Al_2$, $Ga_2$, $In_2$, $S_3$, $Se_3$, $Te_a$, and $Al_2CO_3$.

6. The method of claim 1, wherein the quantum dot is selected from the group consisting of CdSe, CdTe and InP.

7. The method of claim 1, wherein the siloxane polymer has a $T_g$ of less than about 50° C.

8. The method of claim 1, wherein the siloxane polymer has a $T_g$ of less than about 25° C.

9. The method of claim 1, wherein the siloxane polymer comprises amine or carboxy binding groups as the second ligand.

10. The method of claim 1, wherein the reaction mixture is heated to at least about 50° C.

11. The method of claim 1, wherein the reaction mixture is heated to at least about 75° C.

12. The method of claim 1, wherein the mixing is performed for at least about 30 minutes.

13. The method of claim 1, wherein the mixing is performed for at least about 1 hour.

14. The method of claim 1, wherein the mixing is performed for about 2 hours.

15. The method of claim 1, wherein the siloxane polymer comprises

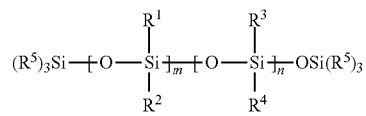

wherein each $R^1$, $R^3$, $R^4$ and $R^5$ can independently be $C_{1-8}$ alkyl, cycloalkyl or aryl, each $R^2$ can independently be $C_{1-8}$ heteroalkyl, $C_{2-8}$ alkylamine and $C_{2-8}$ carboxyalkyl, subscript m can be an integer from 1 to 500, and subscript n can be an integer from 0 to 500.

* * * * *

UNITED STATES PATENT AND TRADEMARK OFFICE
CERTIFICATE OF CORRECTION

| | |
|---|---|
| PATENT NO. | : 9,005,480 B2 |
| APPLICATION NO. | : 14/208095 |
| DATED | : April 14, 2015 |
| INVENTOR(S) | : Furuta et al. |

Page 1 of 1

It is certified that error appears in the above-identified patent and that said Letters Patent is hereby corrected as shown below:

In the Claims

Claim 5, Column 15, line 19, please replace "MN" with --AlN--

Signed and Sealed this
Eighteenth Day of August, 2015

Michelle K. Lee
*Director of the United States Patent and Trademark Office*